US008262132B1

(12) United States Patent
Lagsdin

(10) Patent No.: US 8,262,132 B1

(45) Date of Patent: Sep. 11, 2012

(54) STABILIZER PAD FOR VEHICLES

(76) Inventor: Andry Lagsdin, Hanover, MA (US)

(*) Notice: Subject to any disclaimer, the term of this patent is extended or adjusted under 35 U.S.C. 154(b) by 456 days.

(21) Appl. No.: 12/460,670

(22) Filed: Jul. 22, 2009

Related U.S. Application Data

(60) Provisional application No. 61/135,731, filed on Jul. 23, 2008.

(51) Int. Cl.
*B60S 9/02* (2006.01)

(52) U.S. Cl. .................................. 280/763.1; 248/188.9

(58) Field of Classification Search ............... 280/763.1, 280/764.1, 765.1; 248/188.8, 188.9, 346.01, 248/677, 678

See application file for complete search history.

(56) References Cited

U.S. PATENT DOCUMENTS

| | | | | |
|---|---|---|---|---|
| 4,250,624 A * | 2/1981 | Partington | ...................... | 30/374 |
| 7,267,368 B2 * | 9/2007 | Lagsdin | ...................... | 280/763.1 |
| 2006/0011800 A1 * | 1/2006 | Lagsdin | ...................... | 248/615 |

* cited by examiner

*Primary Examiner* — Frank Vanaman

(74) *Attorney, Agent, or Firm* — David M. Driscoll, Esq.

(57) ABSTRACT

A stabilizer pad structure for supporting earth moving equipment is provided. A weldment is formed of metal plate material that is adapted for connection with a stabilizer arm of earth moving equipment. The weldment includes a mounting plate that defines a pocket, that can be integrally formed with the weldment or a separate material plate secured thereto, for receiving the resilient pad. The structure includes a pair of clamping bars disposed in the pocket, one on each side of the resilient pad. The clamping bars and mounting plate include respective engagement elements for interlocking the clamping bar and mounting plate together. This inhibits the clamp bars from movement in a longitudinal direction, and transfers force from the pad, through the clamp bar, to the mounting plate.

20 Claims, 7 Drawing Sheets

STABILIZER PAD FOR VEHICLES

RELATED CASES

Priority for this application is hereby claimed under 35 U.S.C. §119(e) to commonly owned and U.S. Provisional Patent Application No. 61/135,731 which was filed on Jul. 23, 2008 and which is incorporated by reference herein in its entirety.

FIELD OF THE INVENTION

The present invention relates in general to stabilizer pads for vehicles, and more particularly to stabilizer pads used with backhoe-type vehicles for supporting stabilizer arms of the vehicle.

BACKGROUND OF THE INVENTION

Construction equipment, such as earth-moving vehicles and the like, must be stabilized during construction or digging operations to limit movement of the equipment or vehicles. Typically, stabilization is provided by hydraulically actuated arms that extend from the vehicle and that have earth-engaging pads mounted on their distal ends. When the vehicle or equipment is moved into a working position, if extra stability is needed, the stabilizer arms are hydraulically operated to move from a retracted position, in which the arms generally extend upwardly and out of the way, to a user position in which the arms extend downwardly at an acute angle to the ground surface so that the pads contact the ground surface. When it is desired to move the vehicle, the arms are returned to the retracted position, and the vehicle is moved to a new operating location.

Reversible stabilizer pads for construction equipment, such as earth-moving vehicles and the like, are well-known in the prior art. Examples of such pads are found in U.S. Pat. Nos. 4,761,021; 4,889,362; 5,992,883 and 6,270,119. Such stabilizer pads generally have a first surface for engagement with a softer surface, such as gravel and soft earth, and a more resilient second surface on the opposite side of the first surface for engagement with harder surfaces, such as concrete or asphalt. Typically, the first surface includes flanges with grouser points that permit the pads to dig into the softer, unfinished surface formed by gravel or soft earth, to better anchor and stabilize the vehicle when encountering difficult digging conditions. The first surface is unsuitable for contact with a hard surface, since the grouser points could damage or mar the hard asphalt or concrete. The second surface of the pad typically is formed of a laminated, rubber pad for better stability on the more solid surface provided by concrete or asphalt. The stabilizer pad typically is pivotally mounted to the distal end of the hydraulically operated arm so that the pad may be rotated to contact the ground with either the first surface or the second surface.

U.S. Pat. No. 4,889,362 discloses a reversible stabilizer pad for earth moving vehicles having a generally flanged first surface for engagement with, for example, gravel and soft earth, and a resilient surface for engagement with, for example, concrete or asphalt. This patent describes the use of rubber pads on one side of the stabilizer pad for ground contact when the vehicle is on a finished surface, such as concrete or asphalt, and flanges with grouser points on the opposite side of the stabilizer pad for ground contact when the vehicle is on an unfinished but hard ground surface that requires that the pads dig into the surface in order to better anchor and stabilize the vehicle when encountering difficult digging conditions. The flange side of the pad is unsuitable for contact with a finished surface since it could damage and/or mar the finished surface. The stabilizer pad is pivotally mounted to the end of a hydraulically operated arm such that the pad may be rotated to contact the ground with either the rubber pad side or the flange side facing down to contact the ground surface. When the vehicle is moved into a working position, if extra stability is needed, the stabilizer arms, on which the pads are mounted, are hydraulically operated to move from a retracted position, in which the arms generally extend upwardly and out of the way, to a use position, in which the arms extend downward at an angle with the pads contacting the ground surface. When the vehicle is to be moved, the arms are lifted back to the retracted position, the vehicle is moved to a new operating location and the stabilizer arms are brought down into the use position again, if necessary.

Reference is also now made to co-pending application Ser. No. 11/726,226 filed on Mar. 21, 2007 and describing further improvements to a stabilizer pad, particularly relating to providing a more economical pad and one that is both lightweight and durable. In this pad structure the main metal plate member is formed using certain bending steps so as to minimize the welding of components.

It is an object of the present invention to provide still further improvements to stabilizer pads to enhance their durability, to enable them to be manufactured more economically and to enable effective stability thereof even with a lighter weight construction.

SUMMARY OF THE INVENTION

To accomplish the foregoing and other objects, features and advantages of the present invention there is provided a stabilizer pad structure comprising: a weldment formed of a metal plate material that includes at least one mounting plate that defines a pocket; a resilient pad mounted in the pocket of the mounting plate; and a pair of clamping bars disposed in the pocket, one on each side of the resilient pad; and wherein each clamping bar is constructed and arranged to interlock with the mounting plate.

Other aspects of the present invention include tabs disposed on the clamping bar that interlock with corresponding holes on the mounting plate; the tabs inhibit movement of the clamp bar in a direction along a longitudinal axis of the clamp bar; the tabs transfer force from the pad, through the clamp bar, to the mounting plate; the tabs define a shoulder which engages the underside of a base of the mounting plate; the weldment is adapted for connection with a stabilizer arm of earth moving equipment; and the clamping bars include a plurality of partially open holes along a bottom edge, corresponding to holes on the resilient pad, constructed and arranged to engage with support pins for supporting the resilient pad.

In accordance with another version of the invention there is provided a stabilizer pad structure for supporting earth moving equipment, comprising: a weldment formed of a metal plate material and adapted for connection with a stabilizer arm of the earth moving equipment; a pad constructed of a resilient material having one and another support sides and including opposed wear surfaces; at least one mounting plate secured to the weldment and defining a pocket for receiving the resilient pad; and a pair of clamping bars disposed in the pocket, one on each side of the resilient pad; and wherein the pair of clamping bars and the mounting plate include respective engagement elements that provide an interlock between the clamping bars and mounting plate.

In accordance with still other aspects of the present invention the engagement elements inhibit movement in a direction of the longitudinal axis of the clamping bar; the engagement elements transfer force from the pad, through the clamping bar to the mounting plate; the engagement elements comprise tabs disposed on the clamping bar that interlock with respective holes disposed on the mounting plate; the tabs define a shoulder which engages the underside of a base of the mounting plate; the mounting plate defines side flanges that include a pair of hexagonal-shaped holes for receiving securing members; and the securing members comprise a hexagonal-head shaped bolt and corresponding hexagonal-shaped nut for securing the resilient pad within the weldment.

DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

Figure 1:
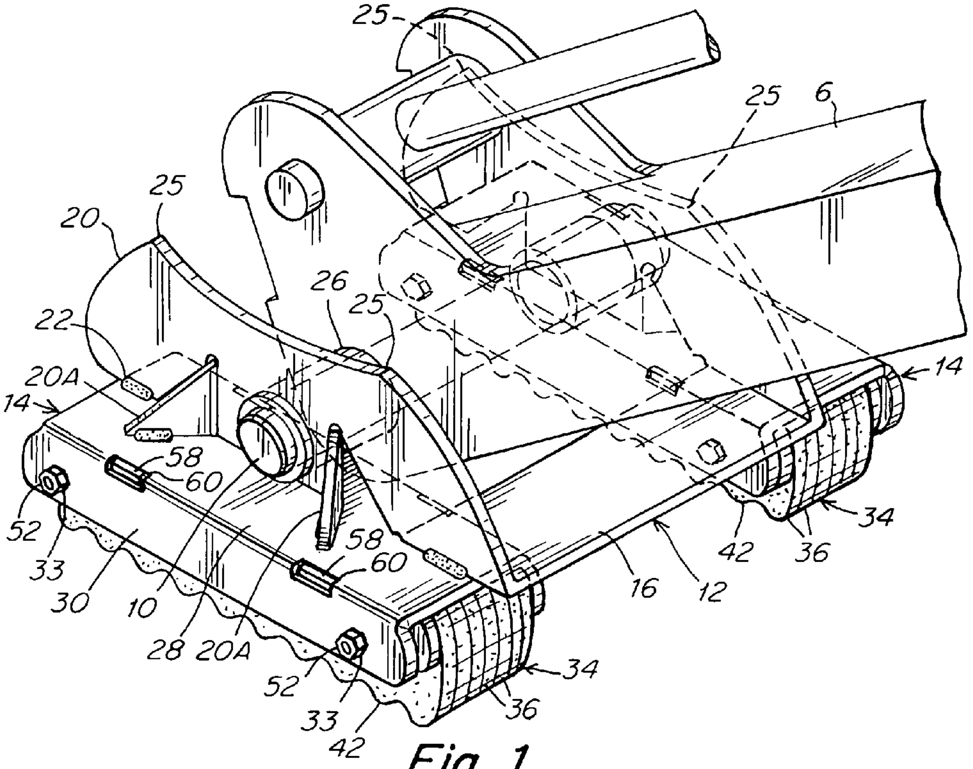
FIG. 1 is a perspective view of a preferred embodiment of the improved stabilizer pad of the present invention.

Reference is now made to the drawings for an illustration of a preferred embodiment of the stabilizer pad of the present invention. The pad that is depicted in the drawings is comprised of a metal weldment that primarily includes the base plate 12 and separately mounted mounting plates 14. Refer, for example, to FIG. 1. The stabilizer pad depicted in the drawings is considered as having a grouser side defined by the separately disposed flanges 20 and a resilient pad side that includes the pair of laminated pads 34. Although laminated pads are illustrated in FIG. 1 of the drawings, and are preferred, it is also understood that the pad 34 may be a solid one piece pad such as a molded rubber pad. It is furthermore anticipated that the principles of the present invention can apply to a stabilizer pad construction in which there is no grouser side of the pad. This is typically referred to as a "street" pad.

In the stabilizer pad of the present invention the base plate 12 is considered of generally U-shape and is formed by a series of bending operations, as will be discussed in further detail hereinafter. Each of the two mounting plates 14 is generally of U-shape and is also formed by a bending operation that is also described in further detail hereinafter. One of the objectives of the present invention is to minimize the amount of welding steps for the pad construction and thus bending steps are used which can be performed more efficiently and with less cost in connection with the construction of the pad. Welds are basically used only between the base plate 12 and the mounting plates 14. These are depicted as welds 22 in the drawings.

Figure 2:
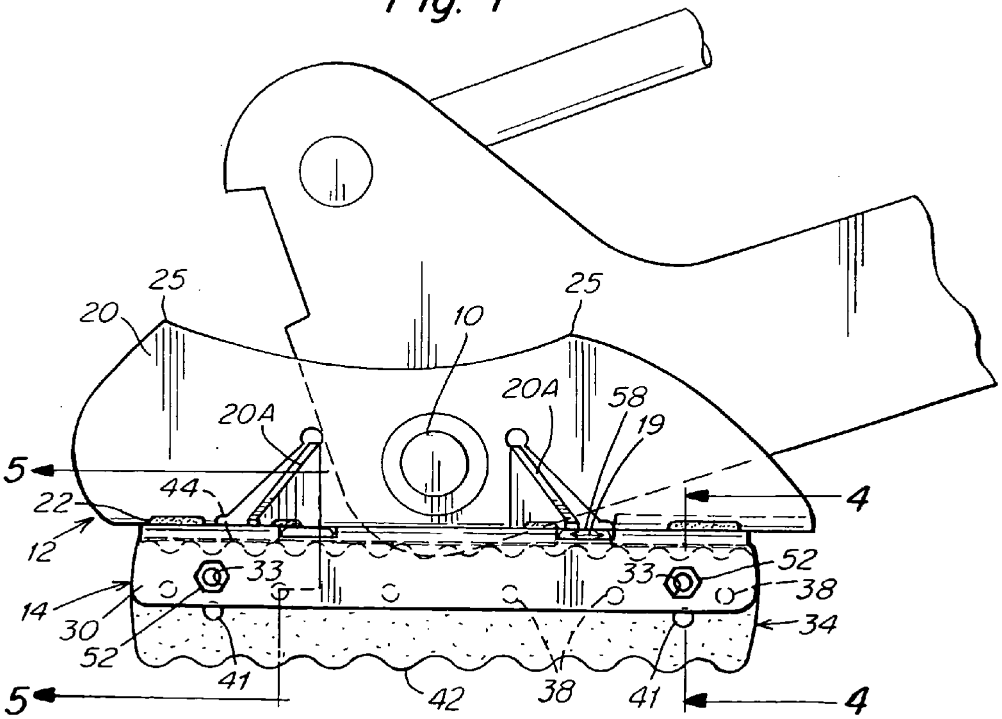
FIG. 2 is a side elevation view of the stabilizer pad of FIG. 1.
Figure 3:
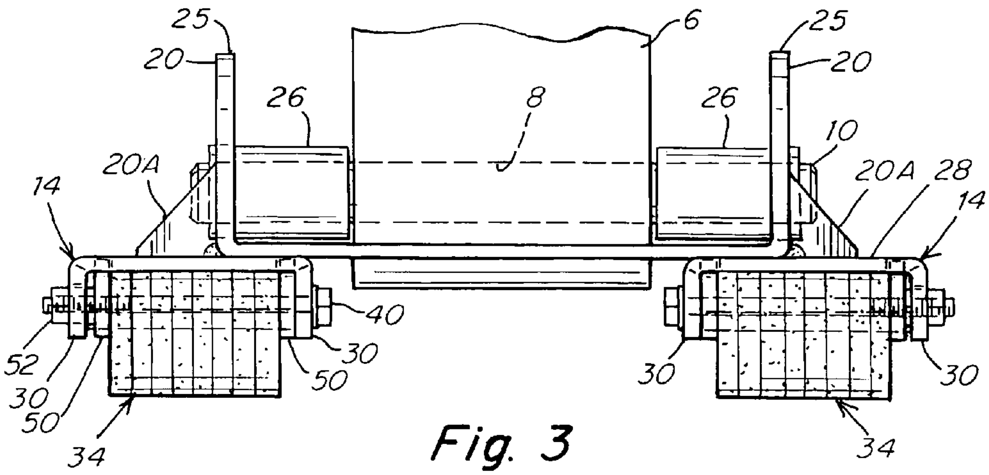
FIG. 3 is a rear elevation view of the stabilizer pad of FIG. 1.

The stabilizer pad that is illustrated in the drawings is meant for support from a stabilizer arm 6 of earth moving equipment such as a backhoe. The stabilizer pad, particularly the weldment and the base plate 12, is supported from the stabilizer arm 6 by means of a pin 10, as illustrated in FIGS. 1-3. For a similar support stabilizer arm refer, for example, to my earlier U.S. Pat. No. 6,270,119 which is hereby incorporated by reference in its entirety. In addition, the following U.S. Patents and Publications are hereby incorporated by reference in their entirety U.S. Pat. Nos. 4,761,021; 4,889,362; 5,992,883; 6,270,119; 6,422,603; 6,471,246; 6,634,672; 6,726,246; 6,986,530; 7,040,659; 7,073,821; 7,172,216; 7,267,368; 2006/0011800; 2008/0048427 and 2008/0122212.

The stabilizer pad is constructed using a main base plate 12 that is generally of U-shape. The base plate 12 supports separately disposed pad mounting plates 14. The base plate 12 includes parallel disposed flanges 20 and an interconnecting bridge piece 16. Each of the flanges 20 define multiple grouser points as illustrated at 25 in FIGS. 1 and 2. To support the base plate 12 with the mounting plates 14, there are also provided, associated with each flange 20, a pair of gussets 20A. A series of welds 22 are used to interconnect the flange 20, as well as the gussets 20A with the base 28 of each of the mounting plates 14. The mounting plates 14 each include, in addition to the base 28, orthogonally bent flanges 30. The base 28 and the flanges 30 together define a pocket into which is disposed the resilient pad 34. Each of the mounting plates 14 is also provided with spaced slots 60 disposed at the outer respective corners between the base 28 and the flange 30. These slots 60 accommodate tabs 58 of the clamp bar 50, as will be described in further detail hereinafter.

FIG. 1 also illustrates the pivot pin 10 which is attached to the flanges 20 by means of respective bushings 26. Each of the bushings 26 may be welded to its corresponding grouser flange 20. The pin 10 may be free to rotate in its corresponding bushing 26, or alternatively, a securing bolt (not shown) may pass through the pin and bushing combination to prevent relative rotation therebetween.

As indicated previously, each of the flanges 20 is provided with spaced grouser points 25. In this regard refer to the side elevation view of FIG. 2 which illustrates the grouser points 25, one disposed on each side of the pin 10. Although two grouser points are illustrated in the disclosed embodiment, a single grouser point may be used or more than two grouser points may be used. Also, as indicated previously, for a street pad that is meant to be used primarily only on the resilient pad side, grouser points do not need to be provided. In addition, for a street pad, sections of the flange 20 construction can be removed so that the pad is lighter in weight.

Figure 4:
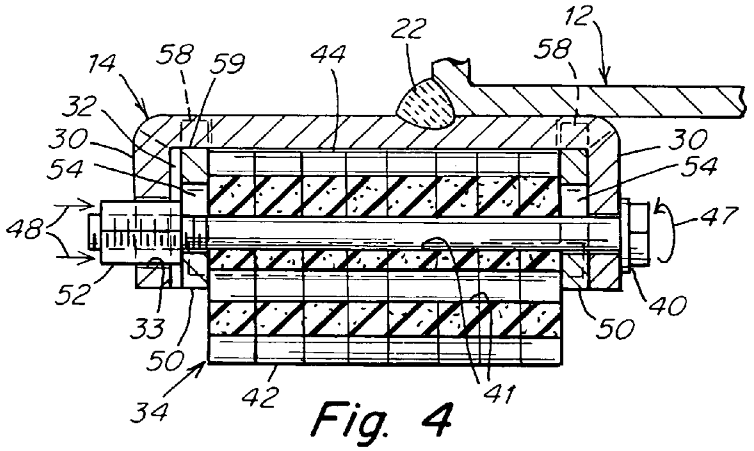
FIG. 4 is a cross-sectional view taken along line 4-4 of FIG. 2.
Figure 5:
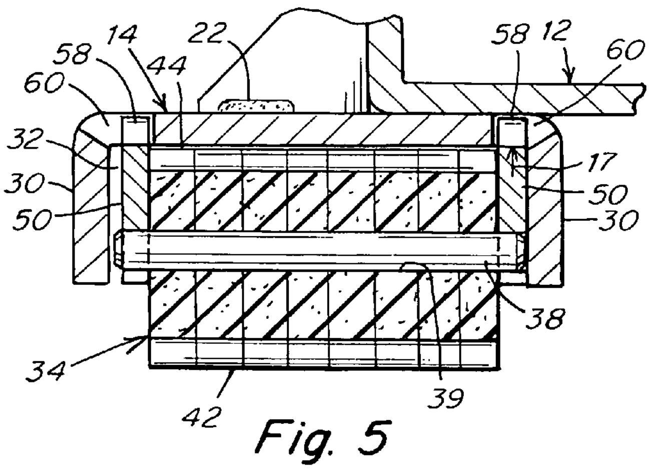
FIG. 5 is a cross-sectional view taken along line 5-5 of FIG. 2.
Figure 6:
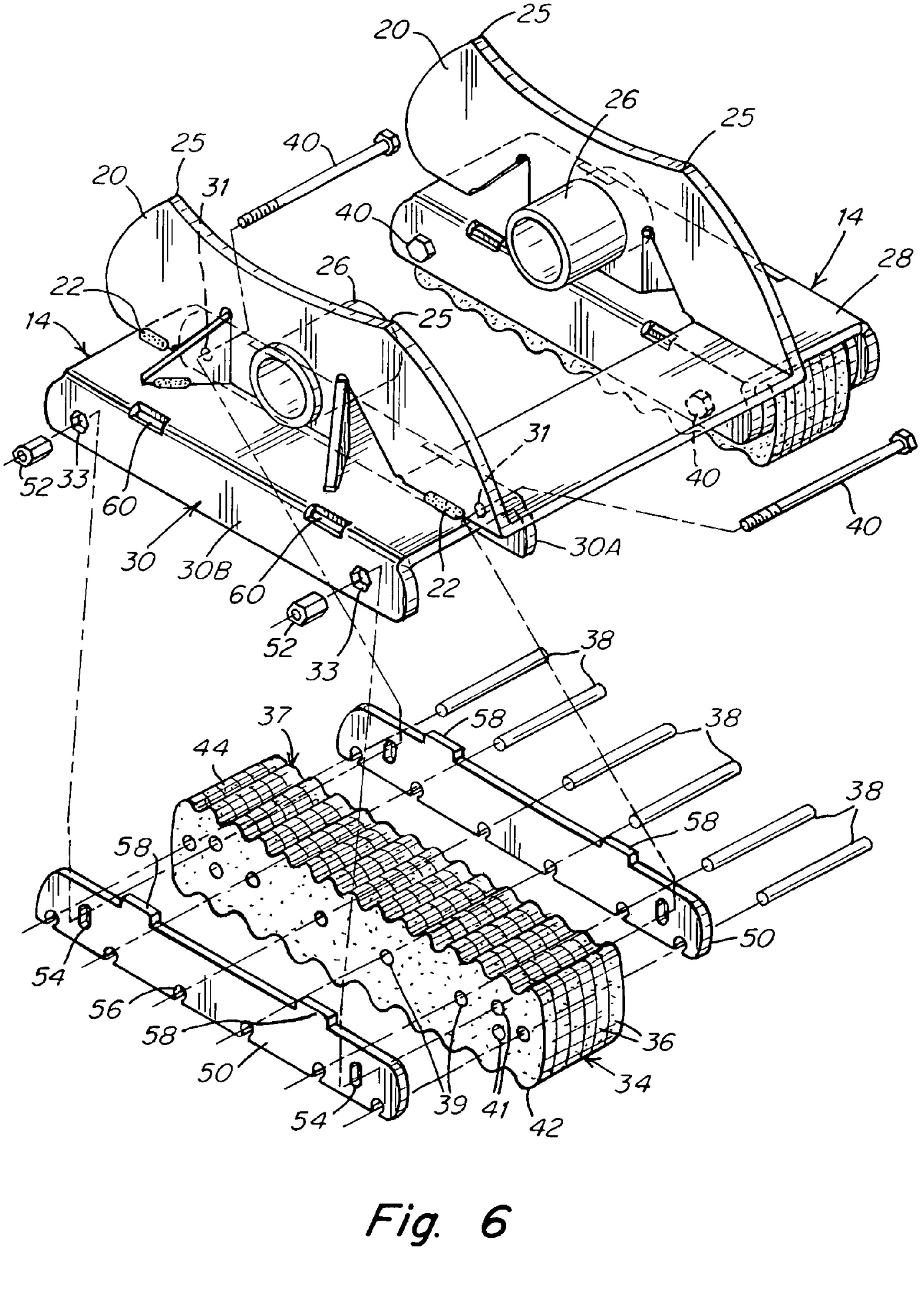
FIG. 6 is an exploded perspective view of the stabilizer pad illustrated in FIG. 1.

Reference is now made to further details of the stabilizer pad of the present invention as illustrated in FIGS. 4-6. As indicated previously, the resilient pad 34 is illustrated as a laminated pad including a plurality of laminations 36. Each of these laminations preferably has a wave shape 37 at both opposed surfaces such as illustrated at opposed surfaces 42 and 44 in FIG. 6. Although this wave shape is preferred, the upper and lower surfaces may also be of other shapes or even planar. For the support of the resilient pad 34, there are provided a series of support pins 38. The resilient pad 34 is provided with a series of holes 39 for accommodating these support pins 38. The resilient pad 34 is also provided with a further pair of holes 41 for accommodating the bolt 40. There is actually a pair of holes 41 at opposite ends of the pad 34, as depicted in, for example, FIG. 6. This accommodates a bolt 40 at each end of the pad 34. A like pair of bolts 40 secures the other pad in the other mounting plate 14. A pair of holes 41 is used so that the different holes can be used by the bolt 40 depending on the positioning of, or reversal of, the pad 34. In this regard refer to the cross-sectional view of FIG. 4 that depicts the bolt 40 passing through an upper hole 41. When the pad is reversed then the bolt 40 will engage the other hole 41.

Each of the mounting plates 14 is provided with an inwardly facing hole 31 for each of the bolts 40 to pass through and securing the resilient pad in place in the mounting plate pocket. There are two holes 31 disposed along the inner flange 30, such as illustrated in FIG. 6. The outer flange 30 is also provided with a pair of holes 33 which in the particular illustrated embodiment is each a hexagonal-shaped hole for receiving the hex nut 52. The holes 33 are similarly spaced apart on the outer flange 30 as were the holes 31 on the inner flange 30. The threaded end of bolt 40 is for engagement with the hex nut 52. The inter-engagement between the hex nut 52 and its accommodating hex-shaped hole 33 prevents rotation of the nut 52 while permitting the bolt 40 to be tightened urging the hex nut 52 against the clamp bar 50 as is clearly illustrated in FIG. 4.

The cross-sectional views of FIGS. 4 and 5 illustrate further details of the clamp bars 50. Refer also to the exploded perspective view of FIG. 6. In the disclosed embodiment both the clamps bars 50 are identical in configuration. Each of the clamp bars includes an upwardly directed set of tabs 58 for accommodation in the respective slots 60. At the bottom edge of each of the clamp bars 50 there is provided partially open holes 56 for accommodating respective support pins 38. In the embodiment illustrated in FIG. 6 there are six support pins 38 and thus also six corresponding holes 56 in each of the clamp bars 50. Lastly, each of the clamp bars 50 is provided with a somewhat elongated slot 54. The slots 54 are for receiving the bolts 40. A pair of slots 54 is provided disposed at respective ends of the clamp bar 50. The slots 54 allow a small amount of “play” in the event that some debris is deposited between the pad and mounting plate.

FIG. 4 is a cross-sectional view taken along line 4-4 of FIG. 2. This cross-sectional view illustrates the hex nut 52 disposed within the hexagonal-shaped hole 33 of the flange 30. FIG. 4 also illustrates by arrow 47 a tightening or rotation of the bolt 40 at its head which causes the nut 52, which remains rotationally stationary, to be urged against the side of the left-most clamp bar 50. This pressure is indicated in FIG. 4 by the arrows 48. In FIG. 4 the bolt 40 at each side is illustrated as extending through the slot 54. FIG. 4 also illustrates the top of each clamp bar 50 with the tab 58 extending through the slot 60. In this position of bolt 40, the resilient pad 34 is at an initial position with a first wear surface 42 in a position facing the ground support surface. In this position it is noted that the bolt 40 passes through the upper one of the through holes 41.

FIG. 5 is a cross-sectional view taken along line 5-5 of FIG. 2 and taken through one of the support pins 38. FIG. 5 also illustrates the wear surface 42. The support pin 38 also has its ends extending through respective holes 56 in the clamp bars 50. The side flanges 30 of the mounting plate 14 prevent the pin 38 from disengaging from the resilient pad. The pins 38 may be lose fitting within the resilient pad 34 or the pins 38 may be force fit with the resilient pad 34. FIGS. 4 and 5 also illustrate an upper second wear surface at 44. Thus, in accordance with the present invention it is preferred that the resilient pad be supported so that after a first wear surface 42 has worn down sufficiently, the resilient pad can be inverted so that the other wear surface, namely surface 44 then becomes the downwardly facing ground engaging wear surface.

In accordance with one aspect of the present invention the stabilizer pad structure is of a relatively more simplified design requiring fewer components and one in which the resilient pad is positively engaged with its retaining structure regardless of which side of the pad is being used as the ground engaging side. In the past bumper bars have been used on either side of the resilient pad structure itself, integral with the resilient pad laminations. In accordance with the present invention rather than providing integral bumper bars on either side of the resilient pad itself, the resilient pad is held primarily by the support pins 38.

In accordance with the present invention, rather than using a pair of bumper bars in combination with the clamp bar, separate clamp bars are used as illustrated by the clamp bars 50 herein. Moreover, these clamp bars are now interlocked with the mounting plate structure via tabs 58 in slots 60. By placing the resilient pack in the pocket defined by the mounting plate, the support pins are prevented from creeping out. Moreover, the clamp bars themselves now serve as support members. In this way, the structure of the present invention is quite simplified, is economical to produce and is characterized by damaged-proof components. In accordance with the present invention, an effective wear surface is provided essentially with less metal and in a smaller-sized resilient pad.

With further reference to FIG. 5, it is noted that the slots 60 are disposed on opposite sides of the mounting plate 14 essentially at the corners between the base 28 and the side flanges 30. Each of the slots 60 extend a sufficient distance, particularly along the base 28 so that as the bolts 40 are tightened the gap 32 is formed with the nut 52 pressing against the left most clamp bar 50. The interlock between the clamp bars 50 and the mounting plate 14, by means of the tabs 58 in slots 60, keep the tabs from sliding in the direction of arrow 19 in FIG. 2. This interlock stabilizes the position of the pad relative to the pad mounting plate 14. Moreover, each of the tabs 58 defines a shoulder 59 which engages the underside of the base 28. This engagement transfers force form the resilient pad, through the support pins 38 to the clamping bar and from there to the mounting plate 14. Refer also to the cross-sectional view of FIG. 5 where the arrow 17 is indicative of the transfer of force from each of the support pins 38 to the mounting plate 14 via the clamping bars 50. This transfer of force occurs in both sides of the resilient pad by virtue of the pair of clamping bars both of which interlock on opposite sides of the base 28 as illustrated in FIGS. 4 and 5.

In the embodiment disclosed herein each of the clamping bars has two tabs. In other embodiments of the present invention fewer or greater numbers of tabs may be provided on each of the clamping bars. These tabs are for interlock with receiving pockets in the resilient pad pocket. As indicated previously, the purpose of these tabs is to limit the movement of the clamping bars, particularly when the first side of the rubber pack is worn down and the rubber pack is reversed. This interlock prevents any potential rollover of the resilient pad when it is reversed. Another function of the interlock between the clamp bar and the mounting plate is to limit the fore and aft movement of the resilient pad pack, particularly when the earth moving equipment is moving. This arrangement allows for the use of smaller, less expensive securing bolts 40. Because most of the force is not transferred through the bolts 40, the primary function of the bolts is now to simply clamp the laminated layers of the resilient pad together and prevent it from falling out of the pocket.

Figure 7:
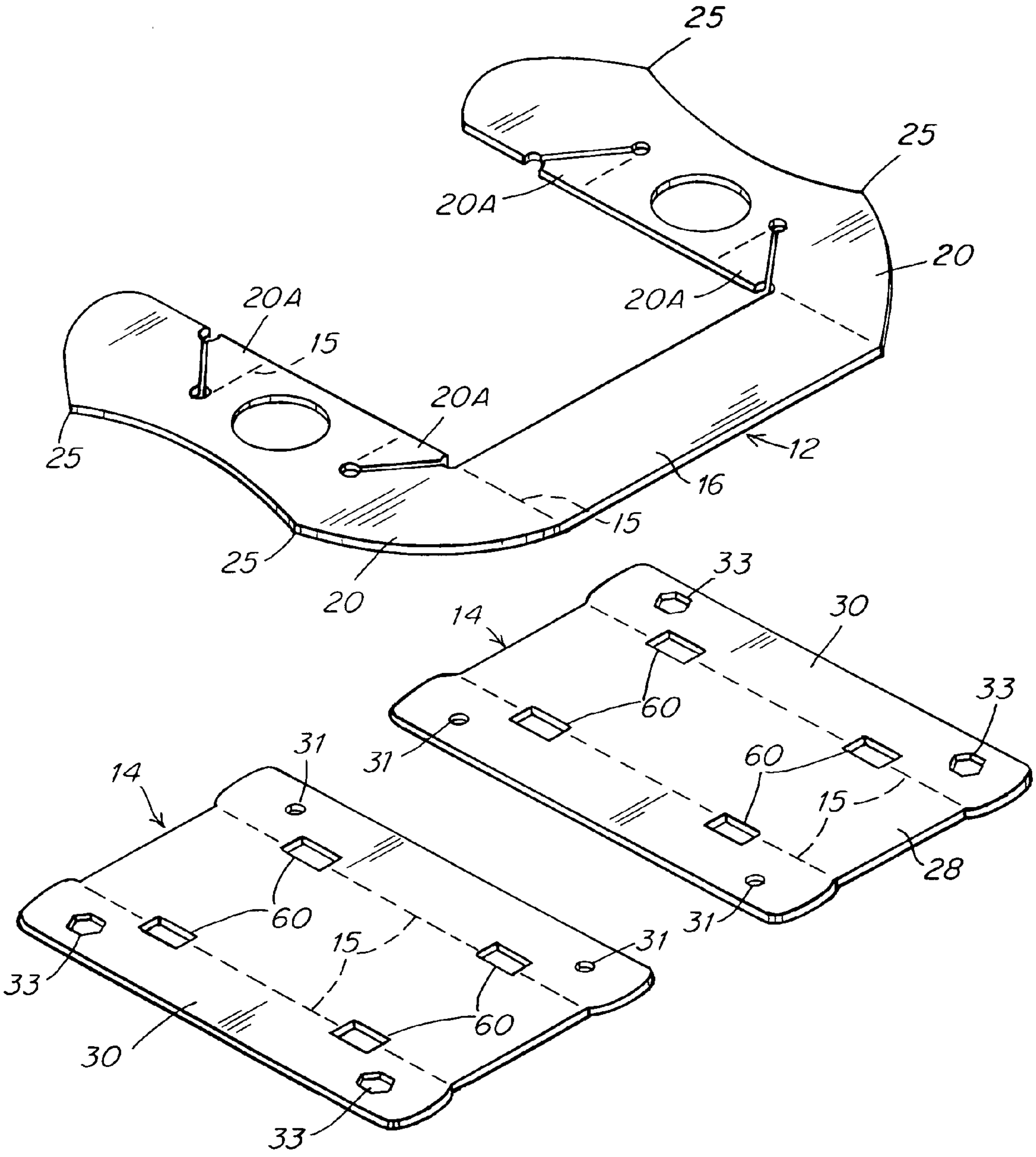
FIG. 7 is a perspective view of flat metal blanks that are usable in constructing the main metal base of the stabilizer pad.
Figure 8:
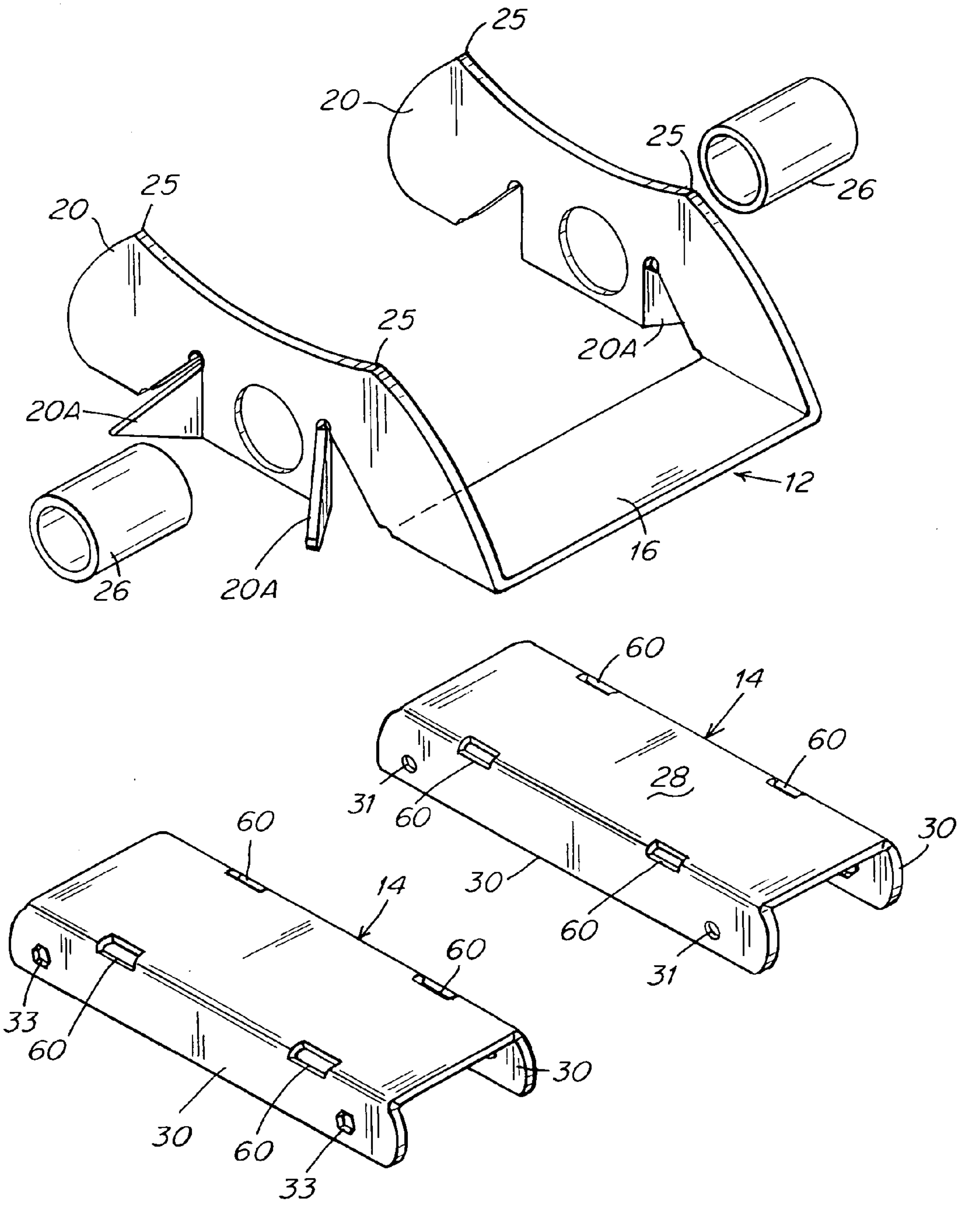
FIG. 8 is an exploded perspective view illustrating a further step in forming the main base of the stabilizer pad with preformed components and before the welding of the assembly.

As indicated previously, one of the advantages of the pad structure of the present invention is the ability to form the basic metal part of the pad using bending steps and attempting to minimize the need for weld points. In this regard, reference is now made to FIG. 7 which shows basic blanks that can be used for forming both the base plate 12 as well as the two mounting plates 14. In FIG. 7 each of the blanks is flat and is meant to be bent along bend lines 15. Thus, the flat blank for the base plate 12 has bend lines 15 for forming the flanges 20 as well as bend lines 15 for forming the gussets 20A. Reference may now be made to FIG. 8 for an illustration of the base plate 12 once the bends have been completed.

FIG. 7 also illustrates two additional blanks that are used for forming the mounting plates 14. These blanks are also bent along lines 15 to form, from the base 28, the side flanges 30. Again, refer to FIG. 8 for the next step in which the bends have occurred and the pad mounting plates 14 are then in their final position forming a pocket for receiving the resilient pad, as well as the pair of clamping bars 50.

The resilient pad 34 may be a single piece molded rubber pad, but is preferably a laminated pad that is comprised of a series of laminated layers 36 as illustrated in, for example, FIGS. 1 and 6. These laminated layers 36 are preferably held together by a series of support pins 38 that pass through holes 39 in the laminated layers. FIGS. 5 and 6 illustrate the configuration of each pad layer. Each of these pad layers, as mentioned previously, preferably has a wave-like ground contact surface 37. The laminated layers may be tied together by means of a force fit of the pins with the holes. Alternatively, the pins 38 may be relatively loosely fit within the holes in each laminated layer.

Figure 10A:
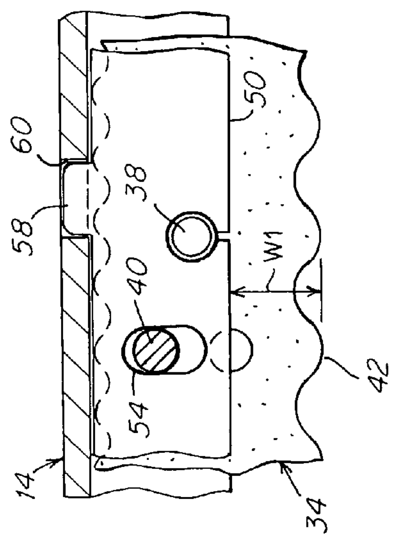
FIGS. 10A and 10B are fragmentary cross-sectional views illustrating a preferred embodiment in accordance with the present invention.
Figure 10B:
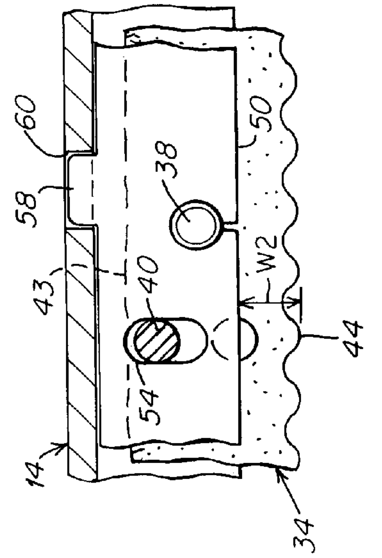
Figure 9A:
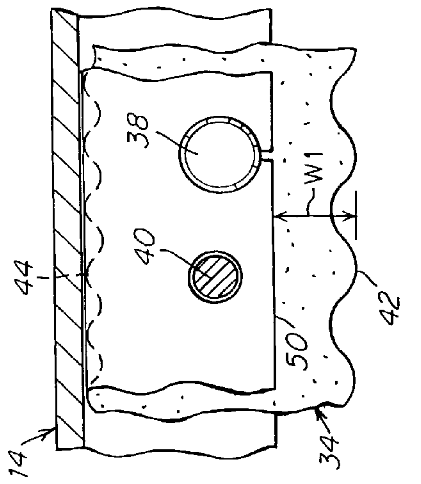
FIGS. 9A and 9B are fragmentary cross-sectional views illustrating one embodiment.
Figure 9B:
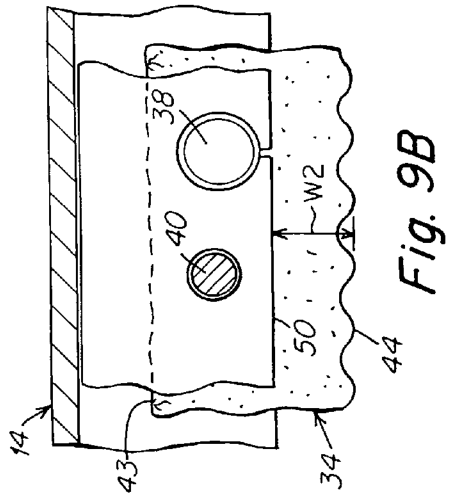

Reference is now made to FIGS. 9 and 10. FIG. 9 is actually separated into FIGS. 9A and 9B and FIG. 10 is separated into FIGS. 10A and 10B. Each of these figures is a cross-section through the bolt and support pin. FIG. 9A shows an arrangement in which the bolt 40 passes through a hole in the clamp bar 50. FIG. 9A also illustrates the support pin 38 which is of a relatively large diameter and larger than the diameter of the bolt 40. In this arrangement the pin 38 may have a diameter of one inch. FIG. 9A also illustrates a wear surface depth W1 which may be on the order of 1⅛ inch or 1.125 inch. This defines a wear surface 42. Also shown in FIG. 9A is the upper wear surface 44 that is not yet in place. Reference to FIG. 9B illustrates the pad pack having been worn down at 43 and reversed so that the wear surface 44 can then be in a position for ground engagement. In FIG. 9B the wear area depth W2 may be on the order of 1.125 inch. The second wear surface 44 is now shown in a position for ground engagement.

FIGS. 10A and 10B illustrate a preferred arrangement in which the bolt 40 rides in a slot 54 that is somewhat elongated. Moreover, the support pin 38 in the embodiment of FIG. 10 is of a smaller diameter and may be in a range of ½-¾ inch or preferably about ⅝ inch in diameter. This provides a wear surface depth W1 that may be on the order of 1.25 inch. FIG. 10B illustrates the resilient pad having been reversed so that the worn surface 43 is now facing upwardly and the new second wear surface 44 is in a position for ground engagement. This provides a wear surface depth W2 of 0.875 inch.

The arrangement illustrated in FIGS. 10A and 10B allows for a smaller diameter support pin 38 to be used as indicated previously. This may be on the order of 0.625 inch in diameter. This, in turn, allows for a reduction in the amount of rubber that need be used while still offering a double-sided rubber construction that provides for two useful wearing surfaces illustrated as surfaces 42 and 44. The first wear surface depth W1 in FIG. 10A is on the order of 1.25 inch and the opposite surface illustrated in FIG. 10B is on the order of 0.875 inch. This is possible as a result of not having to clamp as much rubber in the pin 38 area.

Figure 11:
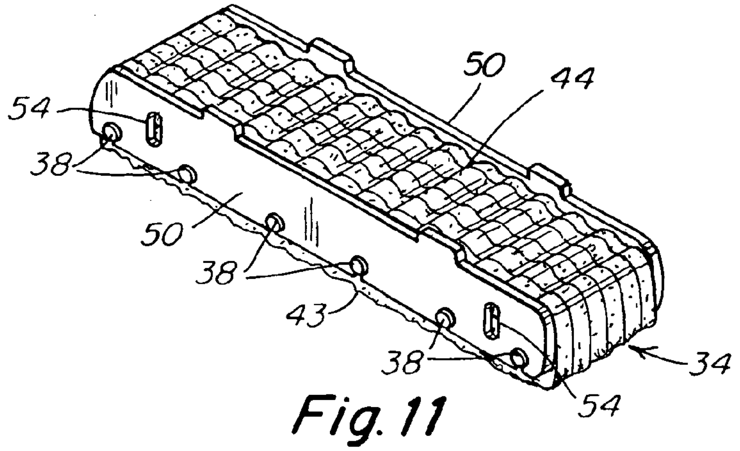
FIG. 11 is a schematic perspective view illustrating the replaceable pad with one side surface worn.
Figure 12:
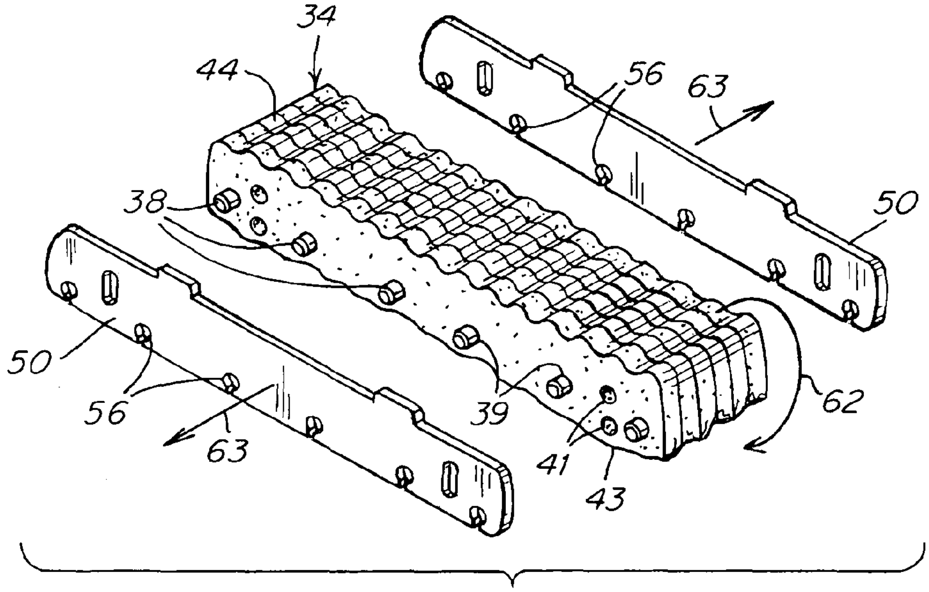
FIG. 12 is a schematic exploded perspective view showing the resilient pad as separated from the clamp bars.
Figure 13:
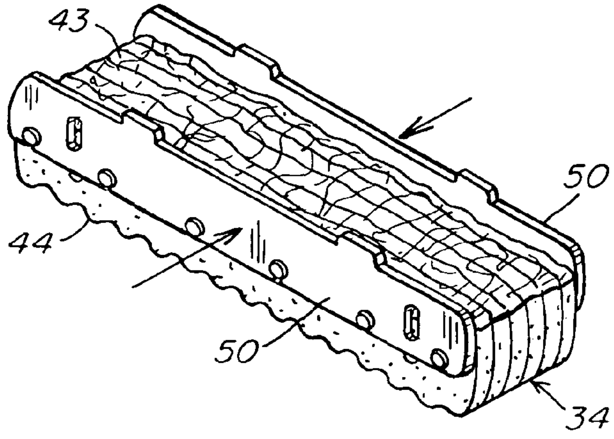
FIG. 13 is a schematic perspective view illustrating the resilient pad having been reversed to illustrate the opposed surface now as a ground contacting surface.

Reference is now made to FIGS. 11-13 for a schematic illustration of the manner in which the resilient pad of the present invention is readily reversible. FIG. 11 is a perspective view illustrating the resilient pad 34 with its associated clamping bars 50. The support pins 38 extend through the resilient pad 34 as well as through the holes 56 in the clamping bars 50. As indicated previously, the pins 38 may be loose fit in the resilient pad or may be force fit therein.

FIG. 12 is an exploded perspective view illustrating the reversal of the position of the resilient pad by means of arrow 62. The two clamping bars 50 may be readily disengaged from the resilient pad as in the direction of arrows 63. The resilient pad 34 may then be reversed in position. Lastly, FIG. 13 is a perspective view illustrating one side of the worn side 43 facing upwardly while the clamping bars 50 have been re-engaged with the support pins 38 so that the assembly shown in FIG. 13 is now ready for re-engagement with the pocket in the mounting plate 14.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, bolts having hex-shaped heads and corresponding hex nuts are depicted for securing the resilient pad within the mounting plate. However, any appropriate securing member can be employed for securing the pad within the mounting plate. Furthermore, the sizing and exemplary numbers used herein are for illustrative and exemplary purposes only. The teachings are clearly applicable to all types of resilient pad structures retained within a pocket formed of a weldment. Accordingly, this description is meant to be taken only by way of example, and not to otherwise limit the scope of this invention.

What is claimed is:

1. A stabilizer pad structure comprising:

a weldment formed of a metal plate material that includes at least one mounting plate having a base and spaced apart side flanges that defines a pocket;

a resilient pad mounted in the pocket of the mounting plate;

at least one securing piece extending through the side flanges and resilient pad for mounting the resilient pad to the mounting plate;

a pair of clamping bars disposed in the pocket, one on each side of the resilient pad;

wherein each clamping bar is constructed and arranged to interlock with the mounting plate;

at least one tab disposed extending upwardly from a top surface of each of the clamping bars, the top surface of the clamping bar, defining with an end of the tab, a shoulder which engages the underside of a base of the mounting plate;

the base of the mounting plate having an aligned slot for receiving the tab.

2. The stabilizer pad structure of claim 1 comprising a pair of tabs spacedly disposed along the top surface of each clamping bar, the base of the mounting plate having spacedly disposed aligned slots for receiving respective tabs.

3. The stabilizer pad structure of claim 2 wherein the tabs inhibit movement of the clamp bar in a direction along a longitudinal axis of the clamp bar by providing each slot with a length that is substantially the same as the length of the corresponding mated tab.

4. The stabilizer pad structure of claim 3 wherein the tabs transfer force from the pad, through the clamp bar, to the mounting plate.

5. The stabilizer pad structure of claim 2 wherein the mounting plate flanges extend substantially orthogonal to the base, and the slots are disposed at corners defined between the base and flange.

6. The stabilizer pad structure of claim 5 wherein the weldment is adapted for connection with a stabilizer arm of earth moving equipment, and each slot has a width greater than the width of the clamping bar so as to allow a gap between one of the flanges and the clamping bar in a secured position of the clamping bars.

7. The stabilizer pad structure of claim 1 wherein the clamping bars include a plurality of partially open holes along a bottom edge, corresponding to holes on the resilient pad, constructed and arranged to engage with support pins for supporting the resilient pad.

8. A stabilizer pad structure for supporting earth moving equipment, comprising:

a weldment formed of a metal plate material and adapted for connection with a stabilizer arm of the earth moving equipment;

a pad constructed of a resilient material having one and another support sides and including opposed wear surfaces;

at least one mounting plate secured to the weldment and including a base and spaced apart side flanges defining a pocket for receiving the resilient pad;

a pair of clamping bars disposed in the pocket, one on each side of the resilient pad;

wherein the pair of clamping bars and the mounting plate include respective engagement elements that provide an interlock between the clamping bars and mounting plate;

wherein the engagement elements include at least one tab disposed extending upwardly from a top surface of each of the clamping bars;

the base of the mounting plate having an aligned slot for receiving the tab;

and the slot is disposed at a corner defined between the base and flange.

9. The stabilizer pad structure of claim 8 wherein the engagement elements inhibit movement in a direction of the longitudinal axis of the clamping bar.

10. The stabilizer pad structure of claim 8 wherein the engagement elements transfer force from the pad, through the clamping bar to the mounting plate.

11. The stabilizer pad structure of claim 8 including a pair of tabs spacedly disposed along the top surface of each clamping bar, the mounting plate having spacedly disposed aligned slots for receiving respective tabs.

12. The stabilizer pad structure of claim 11 wherein the tabs define a shoulder which engages the underside of the base of the mounting plate.

13. The stabilizer pad structure of claim 8 wherein the mounting plate side flanges include a pair of hexagonal-shaped holes for receiving securing members.

14. The stabilizer pad structure of claim 13 wherein the securing members comprise a hexagonal-head shaped bolt and corresponding hexagonal-shaped nut for securing the resilient pad within the weldment.

15. The stabilizer pad structure of claim 8 including a pair of tabs spacedly disposed along the top surface of each clamping bar, the base of the mounting plate having spacedly disposed aligned slots for receiving respective tabs wherein the tabs inhibit movement of the clamp bar in a direction along a longitudinal axis of the clamp bar by providing each slot with a length that is substantially the same as the length of the corresponding mated tab.

16. The stabilizer pad structure of claim 15 wherein the mounting plate flanges extend substantially orthogonal to the base, and the slots are disposed at corners defined between the base and flange.

17. The stabilizer pad structure of claim 16 wherein each slot has a width greater than the width of the clamping bar so as to allow a gap between one of the flanges and the clamping bar in a secured position of the clamping bars.

18. The stabilizer pad structure of claim 8 wherein the weldment includes a pair of spaced apart grouser flanges and a bridge interconnecting the grouser flanges.

19. The stabilizer pad structure of claim 18 including at least one gusset connected between a grouser flange and the base of the mounting plate.

20. The stabilizer pad structure of claim 8 wherein the clamping bars include a plurality of partially open holes along a bottom edge, corresponding to holes on the resilient pad, constructed and arranged to engage with support pins for supporting the resilient pad.

* * * * *